Dec. 27, 1927.                                                1,654,017
J. SCHLENER
THEFT PREVENTING DEVICE
Filed Sept. 20, 1924
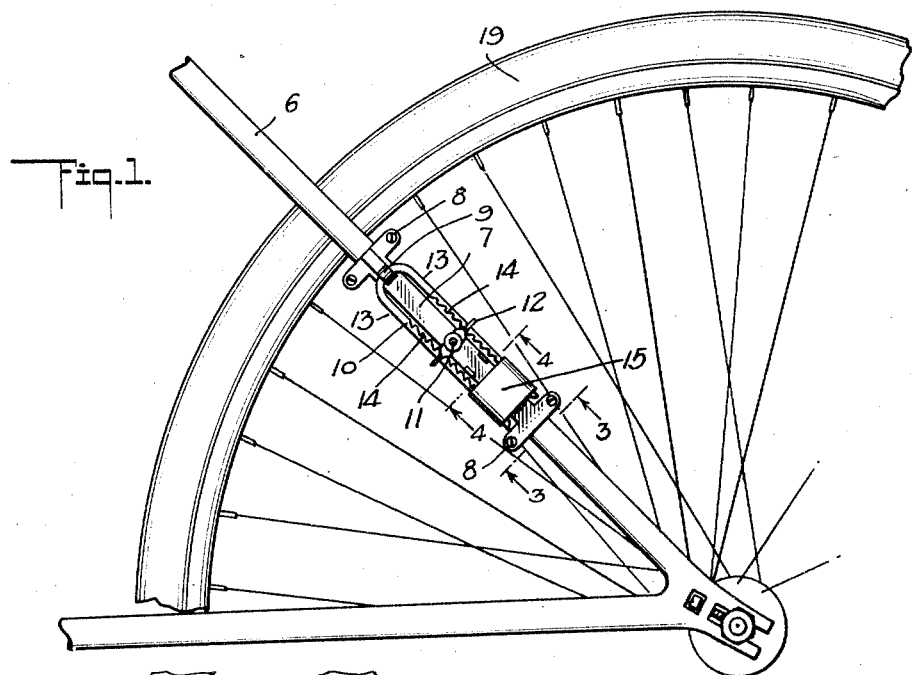
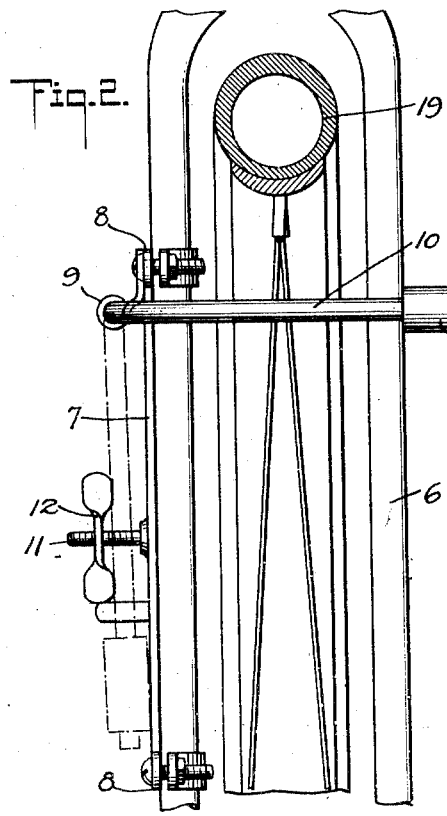
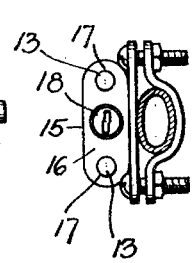
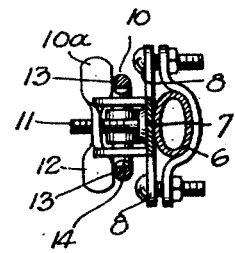
Inventor
JOHN SCHLENER
By Munn & Co.
Attorneys Patented Dec. 27, 1927.

1,654,017

UNITED STATES PATENT OFFICE.

JOHN SCHLENER, OF LOS ANGELES, CALIFORNIA.

THEFT-PREVENTING DEVICE.

Application filed September 20, 1924. Serial No. 738,892.

This invention relates to theft preventing devices, and more particularly to bicycle locking mechanism, and has for its primary object the provision of mechanism adapted to be adjustably supported upon the frame of the bicycle so that it may assume a normal position at one side of the vertical plane of the wheel where it will not interfere with rotation of the latter, and which, when adjusted to a locking position, will project through the wheel parallel with its axis and effect a positive locked engagement therewith.

A further object of my invention is to provide mechanism of this character which can be applied to a bicycle frame of any well known construction without requiring alterations therein.

A further object of the invention is to provide locking mechanism which can be quickly adjusted to any one of the intended positions as the occasion requires.

It is one very important point of my invention to provide a device of this character which is simple and inexpensive of construction and adapted to be wholly carried by the frame of the bicycle at all times so that none of its essential adjuncts, except a controlling key, would be carried on the person of the user.

In the drawings—

Figure 1 is a view in side elevation of a portion of a bicycle frame showing my invention applied thereto and arranged in its normal position;

Figure 2 is a vertical section therethrough showing the device engaged with the wheel to lock same;

Figure 3 is a transverse section on the line 3—3 of Figure 1; and

Figure 4 is transverse section on the line 4—4 of Figure 1.

While I have described my invention for use primarily in connection with bicycles, this shall simply be taken as illustrative and it shall be understood that I am in no way to be limited in this respect.

In Figures 1 and 2 I show a bicycle frame 5 having a fork 6 of usual well known construction. On one of the side bars of the fork is attached a frame member or support 7, the same being clamped in position upon said side bar as shown at 8. The upper end of the frame member 7 is provided with a hinge loop 9 which receives the bight of a U-shaped swinging element 10.

Normally, the swinging element 10 occupies the dotted line position shown in Figure 2. It is substantially parallel with the frame member 7, and it is desirable that the same be secured firmly thereagainst by a clamp. This clamp comprises a threaded stud 11 carried by the frame member 7 at a point between the ends thereof. Mounted on the stud is a winged nut 12 which, when adjusted to the position shown in Figure 4, extends transversely of the element 10 and against the side bars or branches 13—13 thereof. The nut may be turned to assume a vertical position between the bars 13—13 of said element 10 in order that the latter may be swung to a horizontal full line position shown in Figure 2.

The side bars 13—13 are formed with ratchet surfaces 14 adapted to coact with a locking mechanism conventionally illustrated at 15. This locking mechanism embodies a casing 16 having spaced apart openings 17 to slidably accommodate the bars 13—13 of said element 10. The locking mechanism is key controlled, and same is provided with an escutcheon 18 at one end.

When the element 10 is in the dotted line position shown in Figure 2, the locking mechanism is secured in position upon the bars 13—13. When it is desired to move the element 10 to the full line position shown in Figure 2, the locking mechanism is removed. The element 10 is then swung inwardly and upwardly so as to extend entirely through the wheel 19, where its bars 13—13 will become correlated with the adjacent spokes of the wheel so as to prevent rotation of the latter. When the element is thus adjusted, the locking mechanism 15 is again adjusted on to the bars 13—13 as shown. The distance between the said bars 13—13 of the element 10 is sufficiently in excess of the width of the supporting member 7 so as to permit said bars 13 to freely pass against the sides of said supporting plate when moving the element to its adjusted position.

I claim:

A locking device for wheeled vehicles comprising a support adapted to be secured to a frame member of the vehicle and including an elongated flat plate, U-shaped straps adapted to embrace the member, bolts extending through the plate and straps, and nuts on the bolts by means of which the plate is adapted to be clamped to the member, a hinge loop secured at one end and upon the outer side of the plate, a U-shaped locking element hinged in the loop and having its arm portions provided with ratchet teeth, a key controlled locking mechanism adapted to receive and be locked against removal from the arm portions, said element and mechanism normally occupying a position substantially parallel with and at the outer side of the plate, a threaded stud projecting from the outer side of the plate, a winged nut threaded on the stud and adapted to engage the arms of the element to secure the element and mechanism against movement on the plate, said element adapted to be swung inwardly to another position upon removal therefrom of the locking mechanism and in which position the element is adapted to extend through the wheel of the vehicle so as to prevent rotation of the wheel, said element when occupying its last mentioned position adapted to receive between its arms a second frame member of the vehicle so that upon replacing and locking the mechanism upon the arms the element will be locked in its last mentioned position to thereby lock the wheel against rotation.

JOHN SCHLENER.